(12) United States Patent
Esaki

(10) Patent No.: US 10,165,314 B2
(45) Date of Patent: Dec. 25, 2018

(54) PROCESS SYNCHRONIZATION CONTROL SYSTEM AND PROCESS SYNCHRONIZATION CONTROL METHOD

(71) Applicant: MITSUBISHI HEAVY INDUSTRIES, LTD., Tokyo (JP)

(72) Inventor: Yasuo Esaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/629,045

(22) Filed: Jun. 21, 2017

(65) Prior Publication Data

US 2018/0007408 A1    Jan. 4, 2018

(30) Foreign Application Priority Data

Jun. 29, 2016 (JP) .................................. 2016-128684

(51) Int. Cl.
| | | |
|---|---|---|
| *H04L 7/00* | (2006.01) | |
| *H04N 21/242* | (2011.01) | |
| *G06F 11/18* | (2006.01) | |
| *G06F 9/52* | (2006.01) | |
| *H04Q 9/00* | (2006.01) | |
| *G06F 11/16* | (2006.01) | |
| *G06F 11/20* | (2006.01) | |
| *G06F 9/48* | (2006.01) | |

(52) U.S. Cl.
CPC .............. *H04N 21/242* (2013.01); *G06F 9/52* (2013.01); *G06F 11/1679* (2013.01); *G06F 11/18* (2013.01); *G06F 11/2002* (2013.01); *G06F 11/2048* (2013.01); *H04Q 9/00* (2013.01); *G06F 9/48* (2013.01)

(58) Field of Classification Search
CPC .... H04L 7/0083; H04J 3/0688; G06F 9/5016; G06F 9/45533
USPC .......................... 375/357, 364, 365; 361/699
See application file for complete search history.

(56) References Cited

U.S. PATENT DOCUMENTS

2013/0054528 A1* 2/2013 Saika .................... G06F 3/0608 707/638
2015/0205638 A1* 7/2015 Motoki ................. G06F 9/5088 711/162

FOREIGN PATENT DOCUMENTS

JP            2011-248809         12/2011

* cited by examiner

*Primary Examiner* — Khai Tran
(74) *Attorney, Agent, or Firm* — Wenderoth, Lind & Ponack, L.L.P.

(57) ABSTRACT

In a process synchronization control system for performing a synchronization process of synchronizing a process among redundant channels, each of the channels includes an input unit; an output unit; a processing unit; a process execution timer which is used for executing a process in the channels; and a waiting time measurement timer which measures a waiting time in the synchronization process, in which the processing unit executes: a synchronization signal output process of outputting the synchronization signal to other channels at the start of the synchronization process; a synchronization signal input process of waiting for the synchronization signal input from the other channels until a predetermined waiting time by the waiting time measurement timer elapses; and a timer synchronization process of synchronizing the process execution timer if the synchronization signal of the other channels is input after the elapse of the waiting time.

8 Claims, 5 Drawing Sheets

PROCESS SYNCHRONIZATION CONTROL SYSTEM AND PROCESS SYNCHRONIZATION CONTROL METHOD

CROSS-REFERENCE TO RELATED APPLICATIONS

The present application claims priority to and incorporates by reference the entire contents of Japanese Patent Application No. 2016-128684 filed in Japan on Jun. 29, 2016.

FIELD

The present invention relates to a process synchronization control system and a process synchronization control method for synchronizing a process among a plurality of redundant devices.

BACKGROUND

In the related art, there is known a redundant calculation system having a redundant configuration including a plurality of operation units, each of which performs an interrupt process according to an external interrupt request (for example, refer to Patent Literature 1). In this redundant calculation system, each operation unit compares a counter value of a counter provided in the own operation unit with a count value of a counter provided in the other operation unit and corrects a cycle of the operation clock of the own operation unit according to the difference.

CITATION LIST

Patent Literature

Patent Literature 1: Japanese Laid-open Patent Publication No. 2011-248809 A

SUMMARY

Technical Problem

Meanwhile, as a plurality of redundant devices, for example, there is a channel used for a control device for flight. In the case of synchronizing a process among a plurality of the channels, a control device for flight is required to have high reliability and high synchronization accuracy. In Patent Literature 1, correction control (calculation) for correcting a cycle of an operation clock is performed. Therefore, the correction control for synchronization becomes complicated, and the reliability of the calculation associated with the flight control may be deteriorated.

Therefore, it is an object of the present invention to provide a process synchronization control system and a process synchronization control method so that a process among a plurality of redundant devices can be synchronized at a good accuracy and a simple configuration can be achieved with high reliability.

Solution to Problem

A process synchronization control system according to the present invention synchronizes a process among a plurality of redundant devices. Each of the plurality of devices includes an input unit configured to receive a synchronization signal from the other device, an output unit configured to output the synchronization signal to the other device, a synchronization process unit connected to the input unit and the output unit and configured to execute a synchronization process of synchronizing a process with the other device, a process execution timer configured to be used for executing a process in the device, and a waiting time measurement timer configured to measure a waiting time in the synchronization process. The synchronization process unit is configured to execute a synchronization signal output process of outputting the synchronization signal to the other device through the output unit at the start of the synchronization process, a synchronization signal input process of waiting for the synchronization signal input from the other device through the input unit until a predetermined waiting time by the waiting time measurement timer elapses, and a timer synchronization process of synchronizing the process execution timer if the synchronization signal of the other device is input after the elapse of the waiting time.

A process synchronization control method according to the present invention synchronizes a process among a plurality of redundant devices. Each of the plurality of devices is configured to execute a synchronization signal output process of outputting a synchronization signal for synchronizing with other device to other device at the start of a synchronization process, a synchronization signal input process of waiting for input of the synchronization signal from the other device until a predetermined waiting time elapses, and a timer synchronization process of synchronizing a process execution timer used for executing a process in the device if the synchronization signal of the other device is input after the elapse of the waiting time.

According to these configurations, at the start of the synchronization process, the synchronization process unit of the own device can synchronize the process execution timer after waiting for the input of the synchronization signal of other device. Therefore, with a simple configuration of waiting for the input of the synchronization signal, a process among a plurality of redundant devices can be synchronized at a good accuracy, so that it is possible to achieve a system configuration with high reliability. In addition, in order to further improve the reliability, the input unit, the output unit, the synchronization process unit, the process execution timer, and the waiting time measurement timer may be integrated into a package. In addition, the input unit, the output unit, the synchronization process unit, the process execution timer, and the waiting time measurement timer may be configured by connecting individual devices. Furthermore, as a device, for example, there is a system control device for controlling the operation of the actuator.

Further, it is preferable that in the timer synchronization process, the synchronization process unit starts time measurement by the process execution timer after resetting the process execution timer.

According to this configuration, it is possible to easily synchronize the process execution timers provided to a plurality of respective devices. Then, various processes are performed on the basis of the synchronized process execution timer, so that various processes can be executed synchronously among a plurality of devices.

Further, it is preferable that in the timer synchronization process, the synchronization process unit stops outputting the synchronization signal after synchronizing the process execution timer.

According to this configuration, by stopping the output of the synchronization signal, it is possible to prepare for the next synchronization process while suppressing the execution of the timer synchronization process again by mistake.

Further, it is preferable that in a case where there is no input of the synchronization signal from all the other devices within the waiting time in the synchronization signal input process, the synchronization process unit determines that the own device is a failure.

According to this configuration, since failure determination on the own device can be performed on the basis of the presence or absence of the input of the synchronization signal from other device, it is possible to achieve the configuration with higher reliability.

Further, it is preferable that each of the plurality of devices further includes a signal transmission line transmitting the synchronization signal from the output unit to the input unit. It is preferable that in a case where the synchronization signal output from the output unit is different from the synchronization signal input from the input unit through the signal transmission line, the synchronization process unit determines that the own device is a failure.

According to this configuration, since failure determination of the own device can be performed on the basis of the synchronization signals input to and output from the own device, it is possible to achieve the configuration with higher reliability.

Further, it is preferable that in a case where an input of the synchronization signal from the input unit is abnormal, the synchronization process unit determines that the own device is a failure.

According to this configuration, since failure determination of the own device can be performed on the basis of the presence or absence of the input abnormality of the synchronization signal, it is possible to achieve the configuration with higher reliability. In addition, with respect to the input abnormality of the synchronization signal, for example, there are a case where a synchronization signal of the other device is input from the input unit irrespective of the timing at which synchronization process is not performed and a case where a synchronization signal of the other device is input from the input unit irrespective of a state where the other device is in a stopped state of the synchronization process.

Further, it is preferable that if it is determined on the basis of the time measured by the process execution timer that the time measured by the waiting time measurement timer exceeds a preset threshold value or the waiting time measurement timer is stopped, the synchronization process unit determines that the own device is a failure.

According to this configuration, since failure determination of the own waiting time measurement timer can be performed on the basis of an excessive time shift or stop of the waiting time measurement timer, it is possible to achieve a configuration with higher reliability. Specifically, for example, at the time of a synchronization signal input process, time measurement is performed by the process execution timer, and if the time measured by the process execution timer exceeds an upper limit time (limit time), it is determined that the waiting time measurement timer is a failure.

Further, it is preferable that the synchronization process unit executes a down process of stopping the process if it is determined that the own device is a failure.

According to this configuration, since a process by a device that is determined to be a failure can be stopped, it is possible to suppress destabilization of the process or an erroneous process or the like in a normal device.

DESCRIPTION OF EMBODIMENTS

Hereinafter, embodiments of the present invention will be described in detail with reference to the drawings. In addition, the present invention is not limited to the embodiments. In addition, the constituent elements in the following embodiments include those that can be and are easily replaced by those skilled in the art or substantially the same. Furthermore, the constituent elements described below may be appropriately combined, and in a case where there are a plurality of embodiments, the embodiments may be combined.

Embodiment

Figure 1:
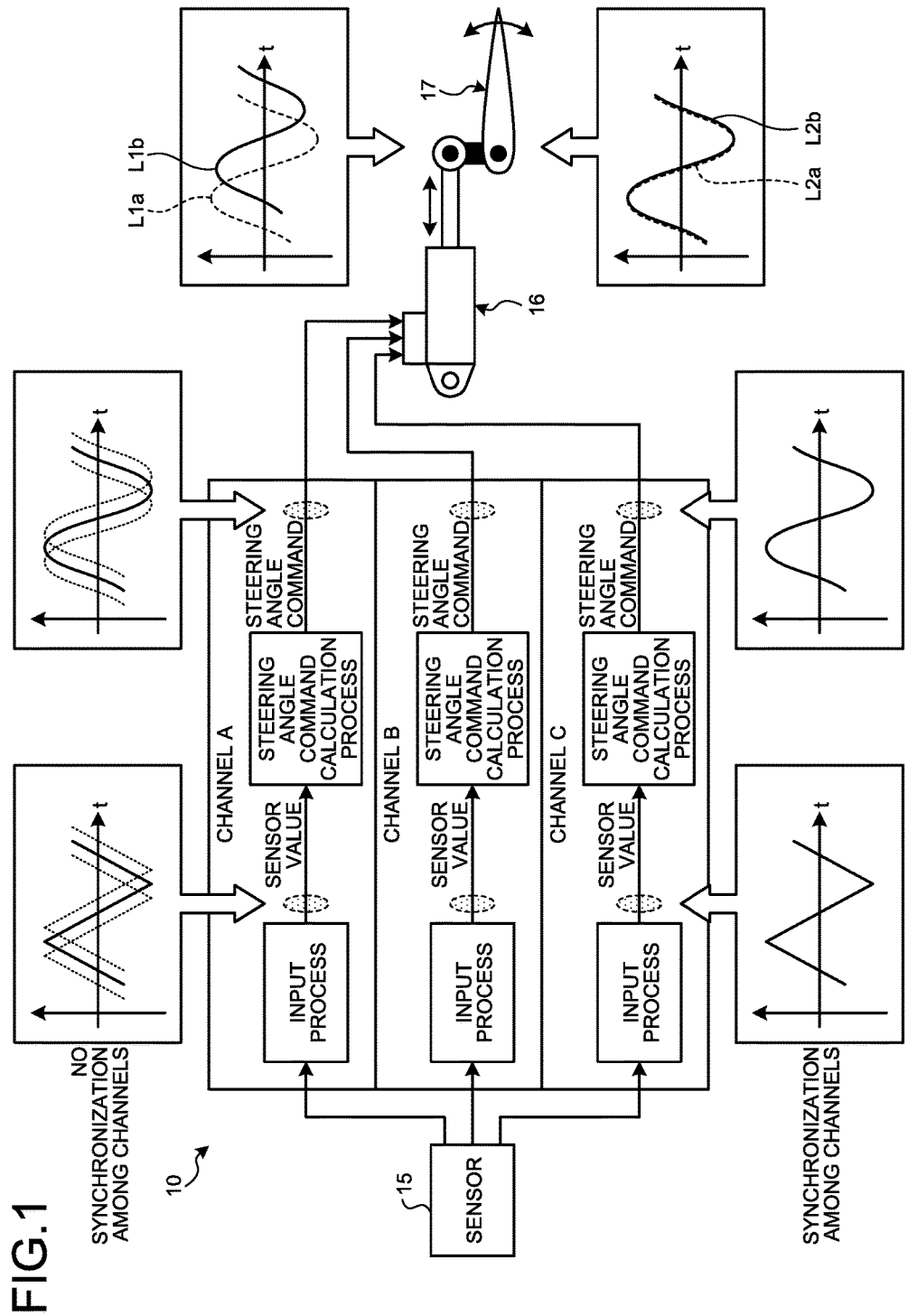
FIG. 1 is an explanatory diagram schematically illustrating a process synchronization control system according to an embodiment.
Figure 2:
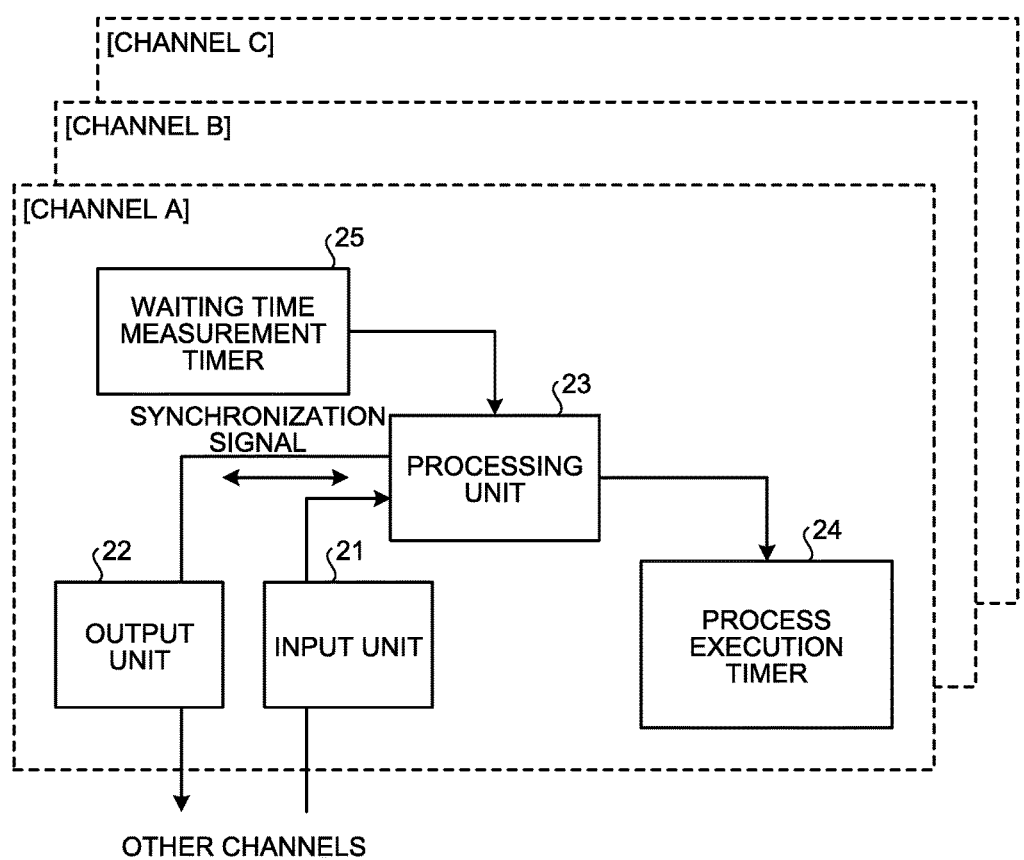
FIG. 2 is an explanatory diagram illustrating the process synchronization control system according to the embodiment.
Figure 3:
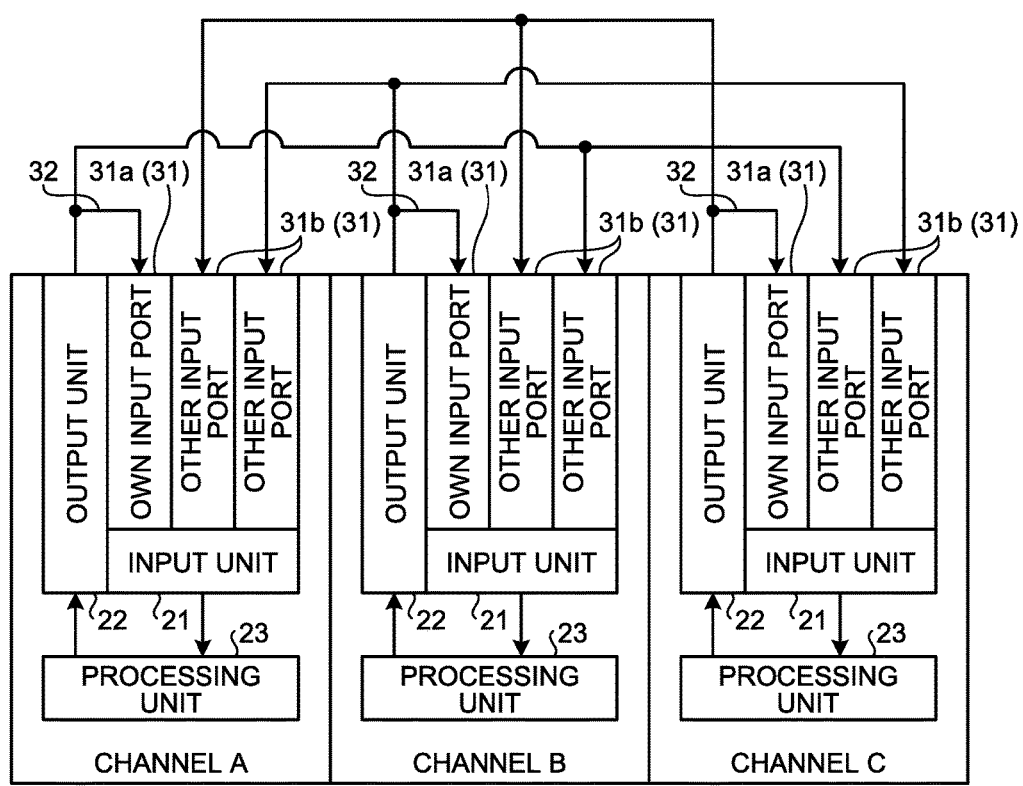
FIG. 3 is an explanatory diagram illustrating a circuit configuration of the process synchronization control system according to the embodiment.
Figure 4:
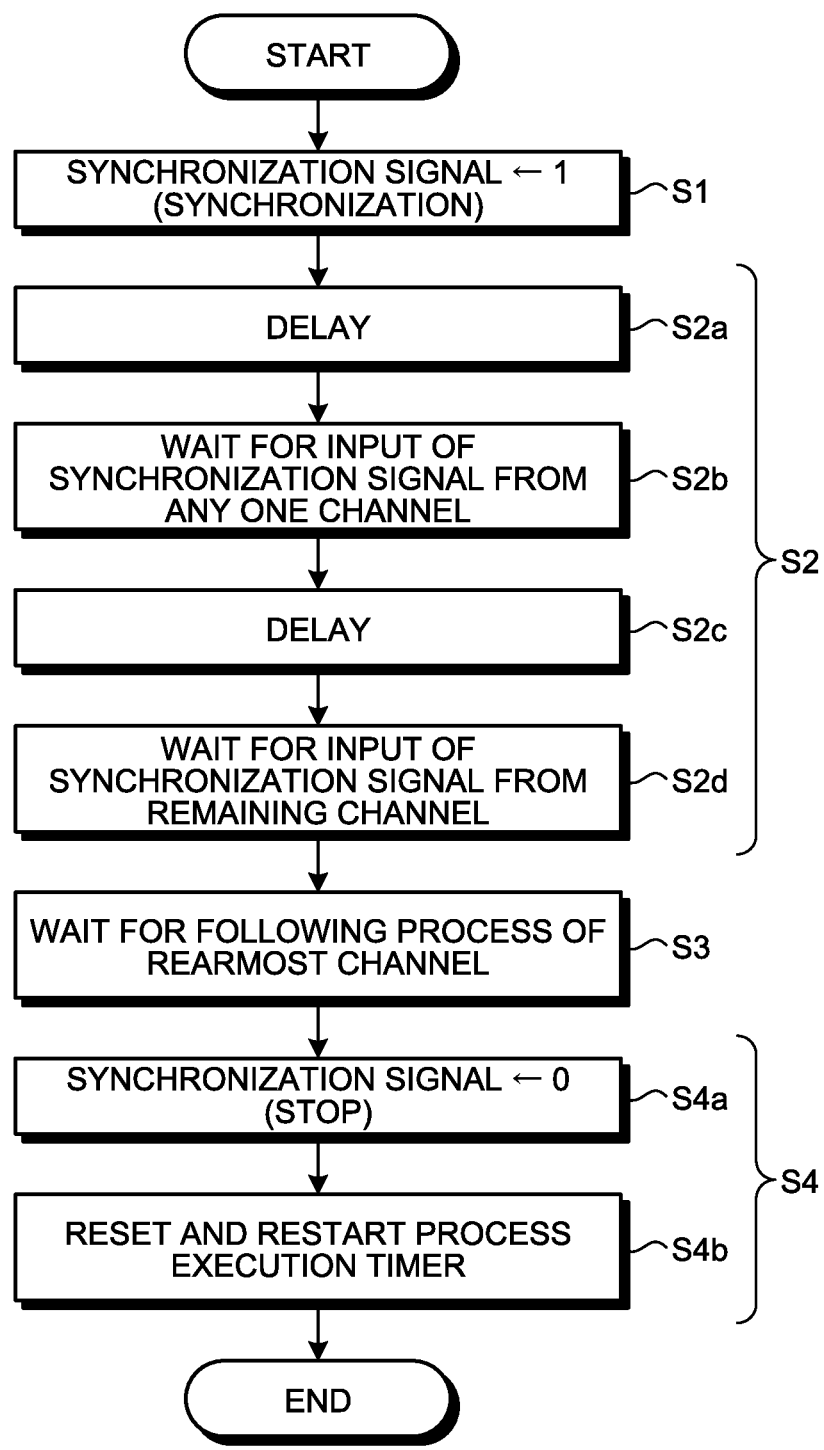
FIG. 4 is a flowchart illustrating an example of a control operation associated with the process synchronization control method according to the embodiment.
Figure 5:
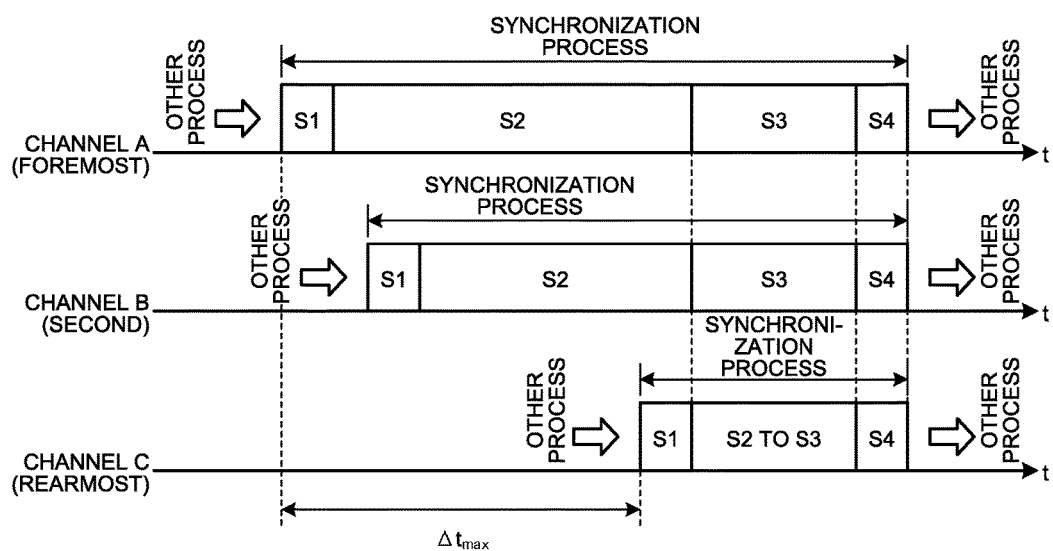
FIG. 5 is an explanatory diagram illustrating an example of a control operation associated with the process synchronization control method according to the embodiment.

FIG. 1 is an explanatory diagram schematically illustrating a process synchronization control system according to the embodiment. FIG. 2 is an explanatory diagram illustrating the process synchronization control system according to the embodiment. FIG. 3 is an explanatory diagram illustrating a circuit configuration of the process synchronization control system according to the embodiment. FIG. 4 is a flowchart illustrating an example of a control operation associated with the process synchronization control method according to the embodiment. FIG. 5 is an explanatory diagram illustrating an example of a control operation associated with the process synchronization control method according to the embodiment.

As illustrated in FIG. 1, a process synchronization control system 10 according to the embodiment is incorporated in, for example, a flight control system that performs flight control of an aircraft. The flight control system is configured to include a plurality of redundant devices. Then, the process synchronization control system 10 is a system for synchronizing a process among the plurality of redundant devices. In the embodiment, although a case where the process synchronization control system 10 is incorporated into the flight control system will be described, it may also be incorporated in a vehicle control system such as an automobile or the like. Any system which synchronizes a process among a plurality of redundant devices may be applied to either system.

As a plurality of devices, for example, there are a plurality of channel devices (hereinafter, simply referred to as channels) A to C such as an input/output control device, and the process synchronization control system 10 is incorporated in each of the plurality of the channels A to C. For example, the process synchronization control system 10 synchronizes a process among the three channels A to C that are triple redundant. In addition, in the embodiment, the triple redundancy is taken as an example. However, the invention is not particularly limited to the triple redundancy.

Various sensors 15 provided in an aircraft are connected to the three channels A to C to acquire respective input signals output from the sensor 15. In addition, an actuator for adjusting the operation state of the aircraft is connected to the three channels A to C. As the actuator, for example, a rudder surface actuator 16 for changing angles (steering angles) of the rudder surfaces of wings 17 such as main wings, a horizontal tail fin, and a vertical tail fin is connected. Therefore, the three channels A to C acquire the respective input signals from the sensor 15, calculate the requested steering angles on the basis of the acquired input signals as the steering angle commands by performing the steering angle command calculation process, and output the steering angle commands as output signals to the rudder surface actuator 16.

In a case where such a synchronization process of synchronizing a process among the three channels A to C is not performed, the input signals input to the respective channels A to C are different in phase as illustrated in FIG. 1. Therefore, the steering angle commands output from each of the channels A to C are also different in phase. If the three steering angle commands having different phases are input to the rudder surface actuator 16 respectively, the rudder surface actuator 16 adjusts the steering angle on the basis of three steering angle commands having different phases. At this time, in the rudder surface actuator 16, interference of the steering angle commands, so-called force fight occurs, and thus, an actual steering angle adjusted by the rudder surface actuator 16 (a solid line L1b) is shifted in phase and amplitude with respect to an ideal steering angle command indicated by a dotted line L1a, and accordingly the flight performance may not be stabilized. Therefore, in the process synchronization control system 10 of the embodiment, the process is configured to be synchronized among the three channels A to C.

Next, the three channels A to C constituting the process synchronization control system 10 will be described with reference to FIGS. 2 and 3. Each of the channels A to C is configured to include an input unit 21, an output unit 22, a processing unit 23, a process execution timer 24, and a waiting time measurement timer 25. Each of the channels A to C is configured as a package device so that each unit is integrated.

The input unit 21 is configured with a plurality of input ports 31, and the plurality of input ports 31 include an own input port 31a and a plurality of the other input ports 31b. The output unit 22 is connected to the own input port 31a through a predetermined transmission line (signal transmission line) 32, and a synchronization signal output from the own channels A to C is input to the own input port 31a. Namely, the transmission line 32 becomes a wraparound circuit. Herein, the synchronization signal is a signal for synchronization among the channels A to C, and the synchronization signal is a binary signal. The output units 22 of the other channels A to C are connected to the other input port 31b through predetermined transmission lines, and the synchronization signals output from the other channels A to C are input. In this manner, the input unit 21 outputs the synchronization signal received from the own channels A to C and the synchronization signal received from the other channels A to C to the processing unit 23.

The output unit 22 outputs the synchronization signal generated by the processing unit 23 of the own channels A to C.

The processing unit 23 includes an integrated circuit and a memory serving as a work area. The processing unit 23 executes various processes associated with the flight control in each of the channels A to C or executes a synchronization process associated with synchronization among the channels A to C. In addition, as various processes associated with the flight control, for example, a process of calculating the above-described steering angle command and the like are included. The synchronization process will be described later in detail. Then, the processing unit 23 functions as a synchronization process unit that executes the synchronization process by executing a program associated with the synchronization process. In addition, the processing unit 23 has a failure detection function for detecting whether or not each of the channels A to C is a failure.

In the case of executing various processes in the processing unit 23, the process execution timer 24 measures the time. Namely, the processing unit 23 executes various processes using the time measured by the process execution timer 24 as a trigger.

The waiting time measurement timer 25 measures the waiting time at the time of the synchronization process. The waiting time is the time to wait for the input of the synchronization signal from the other channels A to C to the own channels A to C. At the time of the synchronization process the processing unit 23 determines whether or not the synchronization signal has been input from the other channels A to C within the waiting time measured by the waiting time measurement timer 25.

Next, a series of control operations associated with the process synchronization control method by the process synchronization control system 10 will be described with reference to FIGS. 4 and 5. In the following description, among the three channels A to C, the one with the earliest timing of the start of the synchronization process is defined as the foremost channel A, the one with the latest timing of the start of the synchronization process is defined as the rearmost channel C, and the one with the timing of the start of the synchronization process between the channel A and the channel C is defined as the channel B. At this time, the timing of the start of the synchronization process of the rearmost channel C is delayed by $\Delta t_{max}$ with respect to the timing of the start of the synchronization process of the foremost channel A. Furthermore, in the following description, the control operation of the foremost channel A will mainly be described.

As illustrated in FIG. 4, the processing unit 23 of the channels A to C in the process synchronization control system 10 executes a synchronization signal output process (synchronization signal output step S1), a synchronization signal input process (synchronization signal input step S2), a wait for following process (wait for following step S3), and a timer synchronization process (timer synchronization step S4).

Herein, the synchronization process in the process synchronization control system 10 is performed at predetermined intervals. For example, the synchronization process is performed at an interval which can stabilize the flight control by appropriately synchronizing the processes while not affect the flight control.

In the synchronization signal output process, at the start of the synchronization process, the processing unit 23 of the channel A outputs the synchronization signal for synchronizing with the other channels B and C to the other channels B and C (synchronization signal output step S1). As described above, the synchronization signal is binarized. The output state of the synchronization signal is set to "1", and the non-output state of the synchronization signal is set to "0".

Subsequently, the processing unit 23 of the channel A performs the synchronization signal input process after the synchronization signal output process. At the time of the synchronization signal input process, the processing unit 23 of the channel A performs the time measurement by the waiting time measurement timer 25 and waits for the input of the synchronization signal from the other channels B and C until the synchronization signal is input from the other channels B and C within a preset predetermined waiting time (synchronization signal input step S2). Namely, in the synchronization signal input step S2, the process is ended at the time when a synchronization signal is input from the other channel B or C within a predetermined waiting time.

Specifically, in the synchronization signal input step S2, at the time of inputting and outputting the synchronization signal at first, the delay (DELAY) for preventing a discrepancy in determination between the channels caused by a response delay of a hardware device including the channels A to C is performed (step S2a). For example, in a case where the synchronization process is started while the channel A is not the foremost channel and is so late as not to be able to synchronize with the other channels B and C, and further in the step S2b described later, the synchronization signals from the other channels B and C are detected before the synchronization signals from the other channels B and C are switched into the non-output state, it is erroneously determined that the channel A can be synchronized with the other channels B and C. In order to avoid such erroneous determination, the delay of the step S2a is performed so as to delay the start of the step S2b.

In the synchronization signal input step S2, after the step S2a, waiting for the input of the synchronization signal from any one of the other channels B and C is performed (step S2b). If the synchronization signal from any one of the channels B and C (indicating the channel B in FIG. 5) is input within the waiting time, the processing unit 23 of the channel A performs the same delay as in the step S2a (step S2c).

In the synchronization signal input step S2, after the step S2c, waiting for the input of the synchronization signal from the remaining one of the other channels B and C is performed (step S2d). If the synchronization signal from the remaining one of the channels B and C (indicating the channel C in FIG. 5) is input within the waiting time, the processing unit 23 of the channel A executes the wait for following process.

At the time of the wait for following process, the processing unit 23 of the channel A further waits until the rearmost channel C catches up the process of the channel A (wait for following step S3). Namely, the start of the synchronization process of the channel C which is the rearmost channel is delayed in comparison with the other channels A and B, and thus, when the wait for following step S3 is performed, the synchronization signal input process can be ended in a state where the processes of all the channels A to C are aligned.

Subsequently, the processing unit 23 of the channel A performs the timer synchronization process after the wait for following process. The processing unit 23 of the channel A synchronizes the process execution timer 24 at the time of the timer synchronization process (timer synchronization step S4).

Specifically, in the timer synchronization step S4, the processing unit 23 of the channel A sets the output value of the synchronization signal to "0" and stops outputting the synchronization signal (non-output state) (step S4a). After that, after resetting the process execution timer 24, the processing unit 23 of the channel A starts (restarts) the time measurement by the process execution timer 24 (step S4b). In this manner, when all the channels A to C execute the step S4b, the time of the process execution timer 24 is aligned, and the processes of the channels A to C are performed at the same timing.

Then, after executing the step S4b, the processing unit 23 of the channel A ends a series of the synchronization process. In the above description, although the control operation associated with the synchronization process of the channel A has been described, portions of the channels B and C, which are different from the channel A, will be described in brief with reference to FIG. 5.

Similarly to the channel A, the channels B and C sequentially execute the synchronization signal output step S1, the synchronization signal input step S2, the wait for following step S3, and the timer synchronization step S4. In the channels B and C, the synchronization signal output step S1, the wait for following step S3, and the timer synchronization step S4 are the same as those of the channel A, and thus, the description thereof will not be repeated.

In the channel B, in the synchronization signal input step S2, since the foremost channel A has already output the synchronization signal, the process proceeds to the step S2c and the step S2d after the step S2a and the step S2b are immediately ended.

In addition, in the channel C, in the synchronization signal input step S2, since the channels A and B have already output the synchronization signal, the process proceeds to the wait for following step S3 after the synchronization signal input step S2 including the step S2a to the step S2d is immediately ended.

Herein, as the resolution of the waiting time measurement timer 25 is smaller, the synchronization control in the process synchronization control system 10 becomes more accurate. In other words, the waiting time measurement timer 25 has a necessary and sufficient resolution for performing the synchronization process in execution of the flight control of the aircraft.

Furthermore, in the embodiment, the waiting time measurement timer 25 appropriate for the flight control of the aircraft is used. However, the waiting time measurement timer 25 having appropriate resolution according to the required system is used.

As described above, in a case where the synchronization process of synchronizing a process among the three channels A to C is performed, the input signals input to the respective channels A to C are synchronized in phase as illustrated in FIG. 1. Therefore, the phases of the steering angle commands output from the respective channels A to C are also synchronized. Then, if the three steering angle commands synchronized in phase are input to the rudder surface actuator 16 respectively, the rudder surface actuator 16 adjusts the steering angle on the basis of the three steering angle commands synchronized in phase. At this time, since the occurrence of force fight caused by the steering angle command is suppressed in the rudder surface actuator 16, the actual steering angle (a solid line L2b) adjusted by the rudder surface actuator 16 exhibits the same behavior as that of the ideal steering angle command indicated by a dotted line L2a, so that the flight performance can be stabilized.

Next, the failure detection function by the processing unit 23 of each of the channels A to C will be described. In a case where the preset failure condition is reached, the processing unit 23 executes a down process of stopping various processes associated with the flight control by the channels A to C.

Specifically, in the steps S2b and S2d of the synchronization signal input step S2, in a case where the failure condition that there is no input of an synchronization signal from all the other channels A to C within the waiting time is reached, the processing unit 23 of the channels A to C determines that the own channels A to C are failures.

In addition, in a case where the failure condition that the synchronization signal output from the output unit 22 is different from the synchronization signal input from the input unit 21 through the transmission line 32 is reached, the processing unit 23 of the channels A to C determines that the own channels A to C are failures.

In addition, in a case where the failure condition that the input of the synchronization signal from the input unit 21 is abnormal is reached, the processing unit 23 of the channels A to C determines that the own channels A to C are failures. Herein, the input abnormality of the synchronization signal includes, for example, a case where the synchronization signals of the other channels A to C are input from the input unit 21 irrespective of the timing at which the channels A to C do not perform a synchronization process. It also includes, for example, a case where the synchronization signals of the other channels A to C may be input from the input unit 21 irrespective of the other channels A to C being in a process stop state (execution state of the down process).

In addition, in the synchronization signal input step S2, the processing unit 23 of the channels A to C executes the time measurement by the process execution timer 24, and in a case where it is a failure condition that the time measured by the waiting time measurement timer 25 exceeds a preset threshold value or is stopped on the basis of the time measured by the process execution timer 24, the processing unit determines that the waiting time measurement timer 25 of the own channels A to C is a failure. Specifically, the processing unit 23 of the channels A to C sets an upper limit time (limit time) for the time measured by the process execution timer 24. The upper limit time is set to be longer than the waiting time. If the waiting time measured by the waiting time measurement timer 25 exceeds the upper limit time, the processing unit 23 of the channels A to C determines that the waiting time measurement timer 25 is a failure.

As described above, according to the embodiment, at the start of the synchronization process, the processing unit 23 of the own channels A to C waits for the input of the synchronization signals of the other channels A to C, and after that, the process execution timer 24 can be synchronized. Therefore, the process synchronization control system 10 can synchronize a process among the plurality of redundant channels A to C with high accuracy with a simple configuration of waiting for the input of the synchronization signal, so that it is possible to achieve the system configuration with high reliability.

Furthermore, according to the embodiment, after resetting the process execution timer 24 provided for each of the plurality of the channels A to C, the time measurement is restarted, so that the plurality of the channels A to C can be simply synchronized. Therefore, various processes are performed by the processing unit 23 on the basis of the synchronized process execution timer 24, so that various processes can be executed in synchronization among the plurality of the channels A to C.

Furthermore, according to the embodiment, by stopping the output of the synchronization signal after synchronizing the process execution timers 24 in the timer synchronization step S4, it is possible to prepare for the next synchronization process while suppressing the execution of the timer synchronization process again by mistake.

Furthermore, according to the embodiment, since it is possible to perform failure determination of the channels A to C on the basis of the presence or absence of the input of the synchronization signal in the synchronization signal input step S2, the process synchronization control system 10 can be configured to have a more reliable configuration.

Furthermore, according to the embodiment, since it is possible to perform failure determination on the own channels A to C on the basis of the synchronization signals input and output in the own channels A to C, the process synchronization control system 10 can be configured with higher reliability.

Furthermore, according to the embodiment, since it is possible to perform failure determination on the own channels A to C on the basis of the presence or absence of the input abnormality of the synchronization signal, the process synchronization control system 10 can be configured with higher reliability.

Furthermore, according to the embodiment, since it is possible to perform failure determination of the waiting time measurement timer 25 of each of the channels A to C on the basis of the excessive time shift or stop of the waiting time measurement timer 25, the process synchronization control system 10 can be configured with higher reliability.

Furthermore, according to the embodiment, since it is possible to perform a down process on the channels A to C determined to be a failure, it is possible to suppress in instability of a process or an erroneous process or the like in normal channels A to C.

In addition, in the embodiment, each of the channels A to C is configured as a packaged device so that each unit is integrated. However, in each of the channels A to C, the input unit 21, the output unit 22, the processing unit 23, the process execution timer 24, and the waiting time measurement timer 25 may be configured by connecting individual devices. The invention is not particularly limited thereto.

Furthermore, in the embodiment, the description has been made by applying the channels A to C as redundant devices, but the invention is not limited thereto. The invention may be applied to any device such as a communication device for which a synchronization process is required.

REFERENCE SIGNS LIST

10 PROCESS SYNCHRONIZATION CONTROL SYSTEM
15 SENSOR
16 RUDDER SURFACE ACTUATOR
17 WING
21 INPUT UNIT
22 OUTPUT UNIT
23 PROCESSING UNIT
24 PROCESS EXECUTION TIMER
25 WAITING TIME MEASUREMENT TIMER
31 INPUT PORT
31a OWN INPUT PORT
31b OTHER INPUT PORT
32 TRANSMISSION LINE
A to C CHANNEL DEVICE

The invention claimed is:

1. A process synchronization control system for synchronizing a process among a plurality of redundant devices, each of the plurality of devices comprising:
   an input unit configured to receive a synchronization signal from the other device;
   an output unit configured to output the synchronization signal to the other device;
   a synchronization process unit connected to the input unit and the output unit and configured to execute a synchronization process of synchronizing a process with the other device;
   a process execution timer configured to be used for executing a process in the device; and
   a waiting time measurement timer configured to measure a waiting time in the synchronization process,
   wherein the synchronization process unit is configured to execute:
   a synchronization signal output process of outputting the synchronization signal to the other device through the output unit at the start of the synchronization process;
   a synchronization signal input process of waiting for the synchronization signal input from the other device through the input unit until a predetermined waiting time by the waiting time measurement timer elapses; and
   a timer synchronization process of synchronizing the process execution timer if the synchronization signal of the other device is input after the elapse of the waiting time.

2. The process synchronization control system according to claim 1, wherein in the timer synchronization process, the synchronization process unit starts time measurement by the process execution timer after resetting the process execution timer.

3. The process synchronization control system according to claim 1, wherein in the timer synchronization process, the synchronization process unit stops outputting the synchronization signal after synchronizing the process execution timer.

4. The process synchronization control system according to claim 1, wherein, in a case where there is no input of the synchronization signal from all the other devices within the waiting time in the synchronization signal input process, the synchronization process unit determines that the own device is a failure.

5. The process synchronization control system according to claim 1,
   wherein each of the plurality of devices further includes a signal transmission line transmitting the synchronization signal from the output unit to the input unit, and
   wherein, in a case where the synchronization signal output from the output unit is different from the synchronization signal input from the input unit through the signal transmission line, the synchronization process unit determines that the own device is a failure.

6. The process synchronization control system according to claim 1, wherein, in a case where an input of the synchronization signal from the input unit is abnormal, the synchronization process unit determines that the own device is a failure.

7. The process synchronization control system according to claim 1, wherein if it is determined on the basis of the time measured by the process execution timer that the time measured by the waiting time measurement timer exceeds a preset threshold value or the waiting time measurement timer is stopped, the synchronization process unit determines that the own device is a failure.

8. The process synchronization control system according to claim 4, wherein the synchronization process unit executes a down process of stopping the process if it is determined that the own device is a failure.

* * * * *